(12) United States Patent
Kuo et al.

(10) Patent No.: US 7,006,293 B2
(45) Date of Patent: Feb. 28, 2006

(54) HIGH BRIGHTNESS DIFFUSER

(75) Inventors: Hui-Lung Kuo, Taipei (TW);
Chun-Hsiang Wen, Hsinchu (TW);
Ming-Lang Tsai, PingTung (TW);
Yaw-Ting Wu, TaoYuan (TW);
Yu-Hsun Wu, ChungLi (TW);
Chih-Kung Lee, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/813,111

(22) Filed: Mar. 31, 2004

(65) Prior Publication Data

US 2005/0046949 A1   Mar. 3, 2005

(30) Foreign Application Priority Data

Aug. 29, 2003  (TW) ............................... 92123852 A (51) Int. Cl.
G02B 5/02       (2006.01)
G02B 13/20      (2006.01)

(52) U.S. Cl. ...................... 359/599; 359/707; 359/837; 362/31

(58) Field of Classification Search ................ 359/599, 359/707, 455–460, 831–837; 362/29, 31; 349/49–57
See application file for complete search history.

(56) References Cited

U.S. PATENT DOCUMENTS

| | | | | |
|---|---|---|---|---|
| 3,791,712 A | * | 2/1974 | Miyagi | 359/455 |
| 5,598,280 A | * | 1/1997 | Nishio et al. | 349/57 |
| 5,995,288 A | * | 11/1999 | Kashima et al. | 359/599 |
| 6,081,380 A | * | 6/2000 | Ohshima et al. | 359/599 |
| 6,222,689 B1 | * | 4/2001 | Higuchi et al. | 359/837 |
| 6,359,732 B1 | * | 3/2002 | Yoshimura | 359/460 |

* cited by examiner

*Primary Examiner*—Thong Q Nguyen
(74) *Attorney, Agent, or Firm*—Troxell Law Office, PLLC (57) ABSTRACT

A solution for fabricating a light diffusing sheet-like device capable of emitting light with superior brightness, that is a high brightness diffuser. The high brightness diffuser mainly includes at least two light diffusing pieces with ridge-shape structure arranged thereon, which can be either convex or concave. The convex ridge-shape structure having a plurality of large convex ridges and a plurality of small convex ridges, which are associated with a ridgeline existing in between two adjacent ridges where the large ridge and small are interlace-arranged, and the ridges along with the associated ridgelines can be longitudinally extended to the same direction. The concave ridge-shape structure is constituted the same way as the convex ridge-shape structure is, but having concave ridges. The high brightness diffuser is fabricated by stacking up the two light diffusing pieces and enabling an included angle to be formed between the two ridge-extending directions of the two light diffusing pieces.

8 Claims, 12 Drawing Sheets

HIGH BRIGHTNESS DIFFUSER

FIELD OF THE INVENTION

This invention relates to a kind of sheet-like light diffusing device, capable of emitting light of superior brightness, that is, a high brightness diffuser, and more particularly to a high brightness diffuser consisted of at least two overlapping light diffusing pieces with ridge-shape structure arranged thereon.

BACKGROUND OF THE INVENTION

Light diffusers adopted in an ordinary large-scale display (e.g. rear projection screen and large-scale liquid crystal display) are commonly located at the outmost layer of the screen, thereby enabling the light emitted with good output brightness and wide-angle uniformity.

Figure 1:
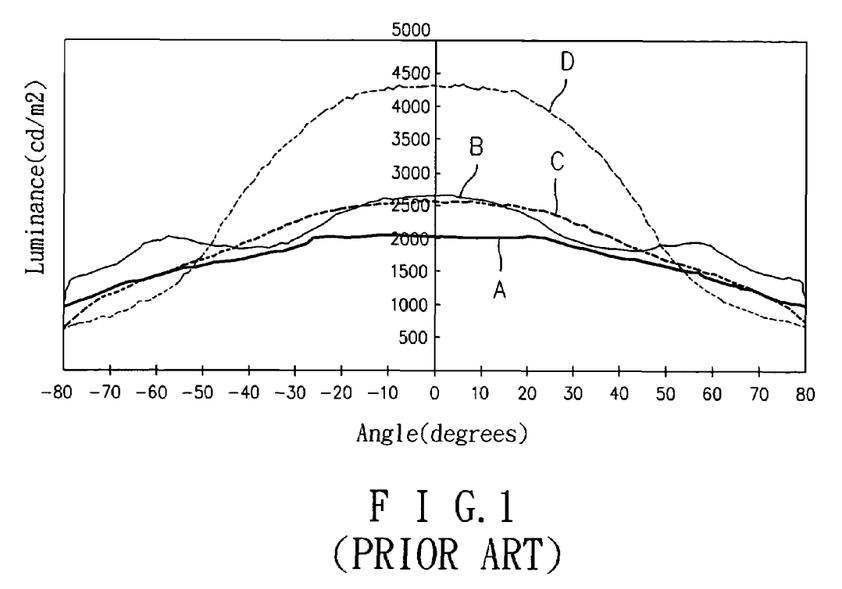
FIG. 1 is the photometric performance of various light diffusers.

FIG. 1 shows the photometric performance pertaining to various kinds of similar products available in the current market. Curve A in FIG. 1 represents the photometric performance of the light diffuser disclosed in U.S. Pat. No. 6,327,083, "REAR PROJECTION SCREEN WITH REDUCED SPECKLE", curves B and C respectively represents the photometric performance of two different conventional light diffusers, and curve D represents the photometric performance of a rear projection light diffuser. As seen in FIG. 1 that the foregoing diffuser can only provide a good photometric performance within the 60° front viewing angle at the audience side of the projection screen, whereas the brightness outside the 60° front viewing angle is considerably reduced. Consequently, the viewer sitting in front of the screen would experience a great brightness disparity when his viewing cover wide side angles. Therefore, the large-scale display screen fabricated by the prior art technique is unable to deliver a uniform illuminance required by the wide-angle viewing.

In addition, for those light diffusers fabricated by the prior art techniques, thick structure of approximately 1 mm is normally needed to boost the light diffusion efficiency when they are used in the large-scale display screen. The design as such would either reduce the brightness output or fail to meet the aforementioned requirement for wide-angle viewing. If the thickness of the light diffusing sheet member can be made thinner, said element can be used in the modern rear projection module.

Figure 2:
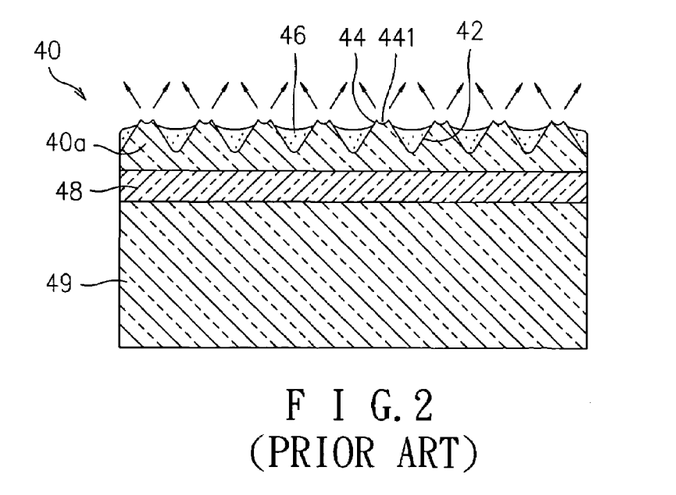
FIG. 2 is a schematic diagram illustrating a conventional diffuser.

FIG. 2 represents a schematic drawing of the diffuser disclosed in the U.S. Pat. No. 6,327,083. As seen in FIG. 1, the diffuser 40 is made up of a front lenticular lens array 40a having unique microstructure design, a bulk region 48, and a clear region 49. The lenticular lens array 40a is composed of a plurality of concave elements 42 and convex elements 44 aligned orderly, wherein the concave element 42 is filled with light diffusing particles 46. Closed examination at the structure of convex element reveals a depression of concave shape 441 and a wavy contour of varying flatness. The drawback of aforementioned invention is that the lenticules array 40a designed as such would require fabrication technologies involving semiconductor manufacturing and various sophisticated mechanical processing techniques, thus resulting in poor manufacturability and high manufacturing cost. Furthermore, despite having the advantage of being able to reduce the speckle patterns, as is claimed in this prior art, the aforementioned diffusion means is incapable of emitting light with superior brightness and good wide-angle uniformity.

SUMMARY OF THE INVENTION

In light of the drawback associated with the prior art, the primary object of the present invention is to provide a high brightness diffuser consisted of at least two overlapping light diffusing pieces with ridge-shape structure arranged thereon, so that the high brightness diffuser with reduced thickness capable of emitting light of superior brightness and of wide-angle uniformity can be fabricated, and thus can be applied in a rear projection module.

The secondary object of the present invention is to provide a solution for fabricating a high brightness diffuser comprising at least two light diffusing sheets, and each light diffusing sheet further comprising a substrate, a ridge-shaped layer and a diffusion layer, wherein the diffusion layer includes a transparent region and numerous light-diffusing particles uniformly dispersed inside the transparent region, and the substrate having a rugged external surface is sandwiched in between the ridge-shaped layer and the diffusion layer. Alternatively, the diffusion layer is placed in between the ridge-shaped layer and the substrate and the transparent region of the diffusion layer has a rugged surface facing toward the ridge-shaped layer.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 3:
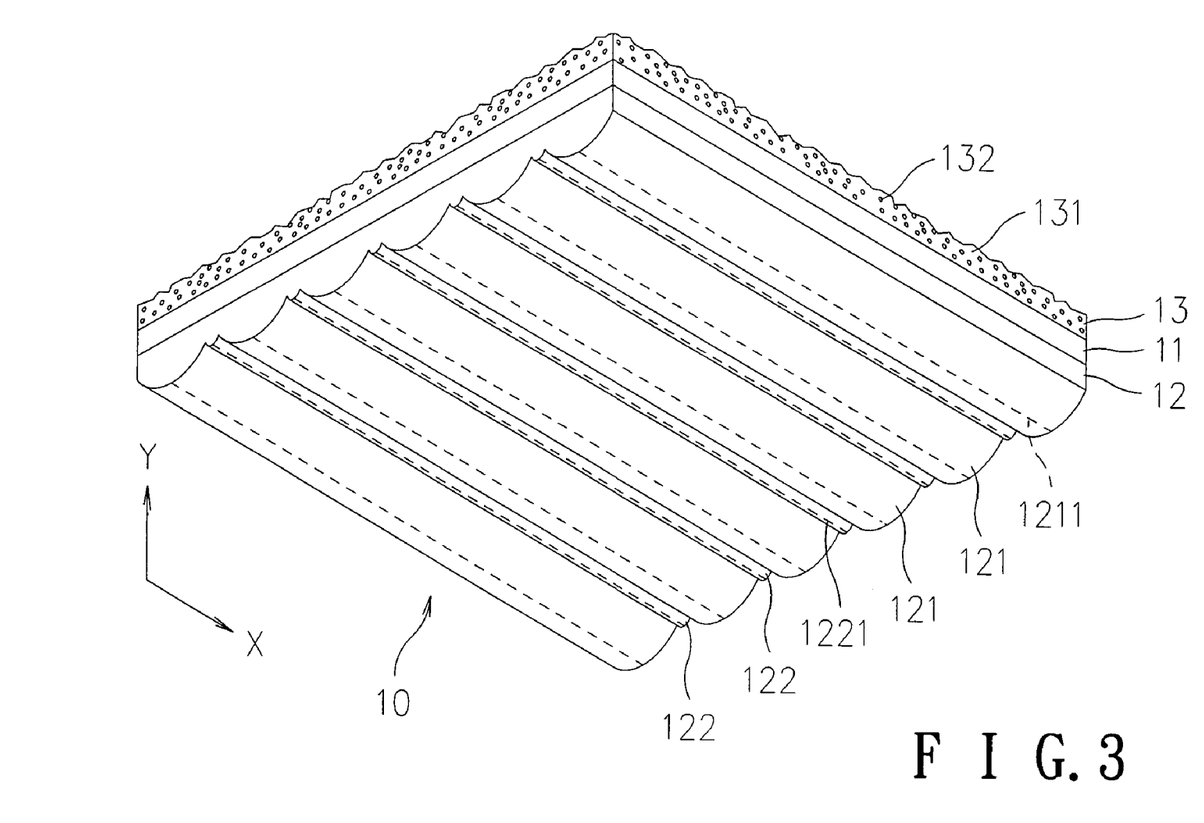
FIG. 3 is a 3D diagram of the convex diffusing piece according to the present invention.

FIG. 3 shows a convex diffusing piece according to the present invention. The convex diffusing piece 10 comprises a substrate 11, a ridge-shaped layer 12 and a diffusion layer 13. The substrate 11, ridge-shaped layer 12 and diffusion layer 13 all are transparent. As seen in FIG. 3, the substrate is sandwiched in between and the diffusion layer 13 and the ridge-shaped layer 12. The ridge-shaped layer 12 has a plurality of large convex ridges 121 and small convex ridges arranged thereon where the large convex ridges 121 is disposed immediately next to its smaller counterpart 122, and all of these ridges are parallel to the X-axis as shown in FIG. 3. The large convex ridges 121 has a ridgeline 1211 associated with it. With an inter-ridge distance being defined as the distance between the ridgelines of the two adjacent large ridges, and a ridge height being defined as the difference of altitude between the ridgeline and the line separating the large ridge and the small ridge, the inter-ridge distances are equal to each other and the ridge heights are equal to each other. In addition, the small convex ridges 122 has a ridgeline 1221 associated with it. With an inter-ridge distance being defined as the distance between the ridgelines of the two adjacent small ridges, and a ridge height being defined as the difference of altitude between the ridgeline and the line separating the large ridge and the small ridge, the inter-ridge distances are equal to each other and the ridge heights are equal to each other. The diffusion layer 13 is made up with a transparent thin layer 131 and numerous light-diffusing particles 132, which are uniformly dispersed within the transparent layer 131. One side of said transparent layer has a rugged surface, and the sizes of the diffusion particles 132 may range from several tens of nanometers to several units of micrometers. The light-diffusing particles 132 may have the shapes that include but not limited to sphere, oval, cylinder or other polyhedrons. In order to reduce the amount of light absorbed during diffusion, the chemical composition of the light diffusion particles 132 may include those materials having zero extinction coefficient substantially equal to zero, such as $TiO_2$, $SiO_2$, $BaSO_4$, $MgO_2$ or ZnS.

Figure 4:
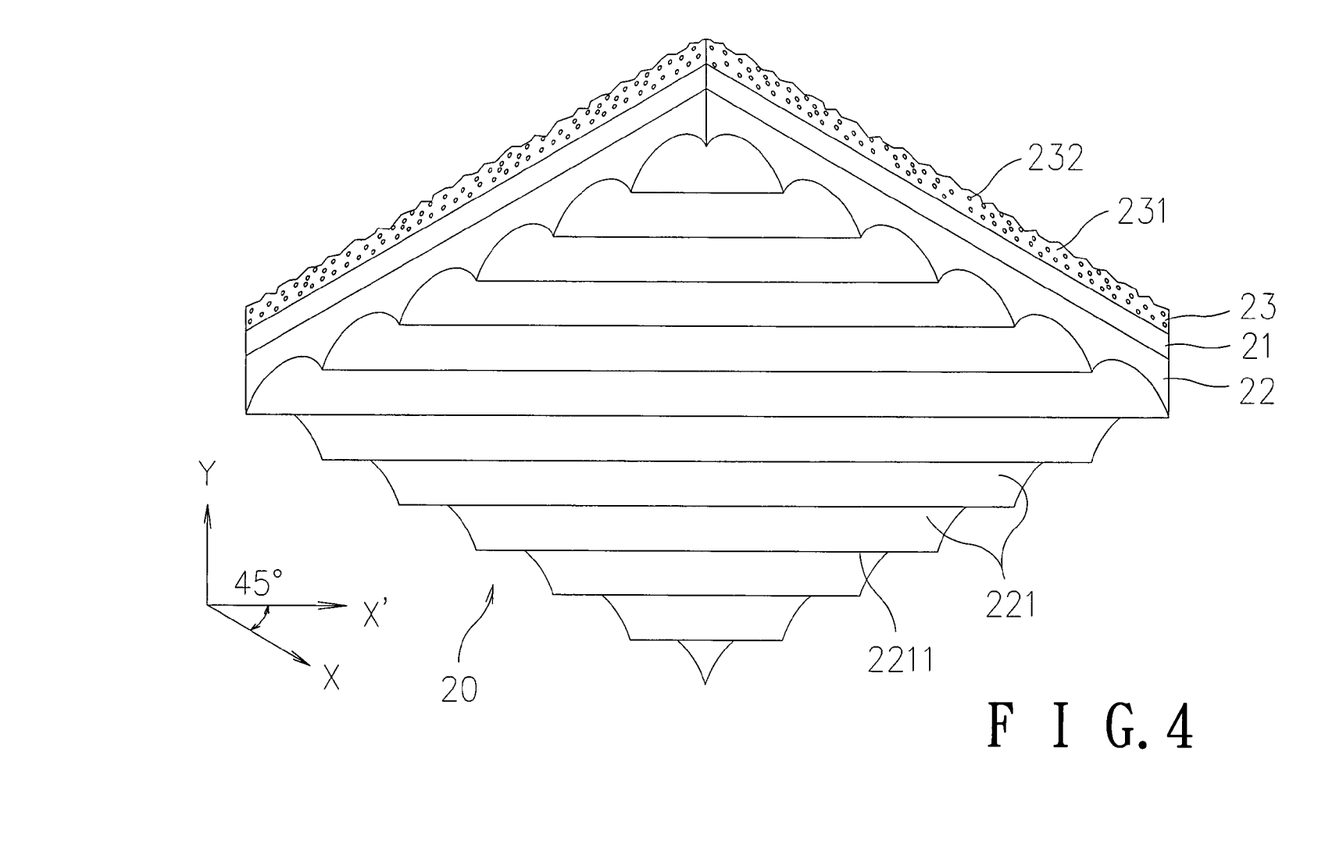
FIG. 4 is a 3D diagram of the concave diffusing piece according to the present invention.

FIG. 4 shows a concave diffusing piece according to the present invention. The concave diffusing piece 20 comprises a substrate 21, a ridge-shaped layer 22 and a diffusion layer 23. The substrate 21, ridge-shaped layer 22 and diffusion layer 23 all are transparent. As seen in FIG. 4, the substrate 21 is sandwiched in between the ridge-shaped layer 22 and the diffusion layer 23. The ridge-shaped layer 22 has a plurality of concave ridges 221 arranged thereon. Between every two concave ridge, there has a ridgeline 2211. With an inter-ridge distance being defined as the distance between the ridgelines 2211 of the two adjacent concave ridges, and a ridge height being defined as the difference of altitude between the ridgeline and the bottom line (or the center line or the valley), of the concave ridge, the inter-ridge distances are equal to each other and the ridge heights are equal to each other. Each concave ridge along with its ridgeline have an extension line parallel to the X'-axis, where the X'-axis and aforementioned X-axis makes an included angle of 45°. The diffusion layer 23 is composed with the thin transparent layer 231 and the light-diffusing particles 232 uniformly dispersed within the transparent layer 231. The transparent layer 231 has a rugged surface, and the sizes of the diffusion particles 232 may range from several tens of nanometers to several units of micrometers. The light diffusing particles 232 may have the shapes that include but not limited to spheres, ovals, cylinders or other polyhedrons. In order to reduce the amount of light absorbed during diffusion, the chemical composition of the light diffusion particles 232 may include those materials having zero extinction coefficient zero, such as $TiO_2$, $SiO_2$, $BaSO_4$, $MgO_2$ or ZnS.

Figure 5:
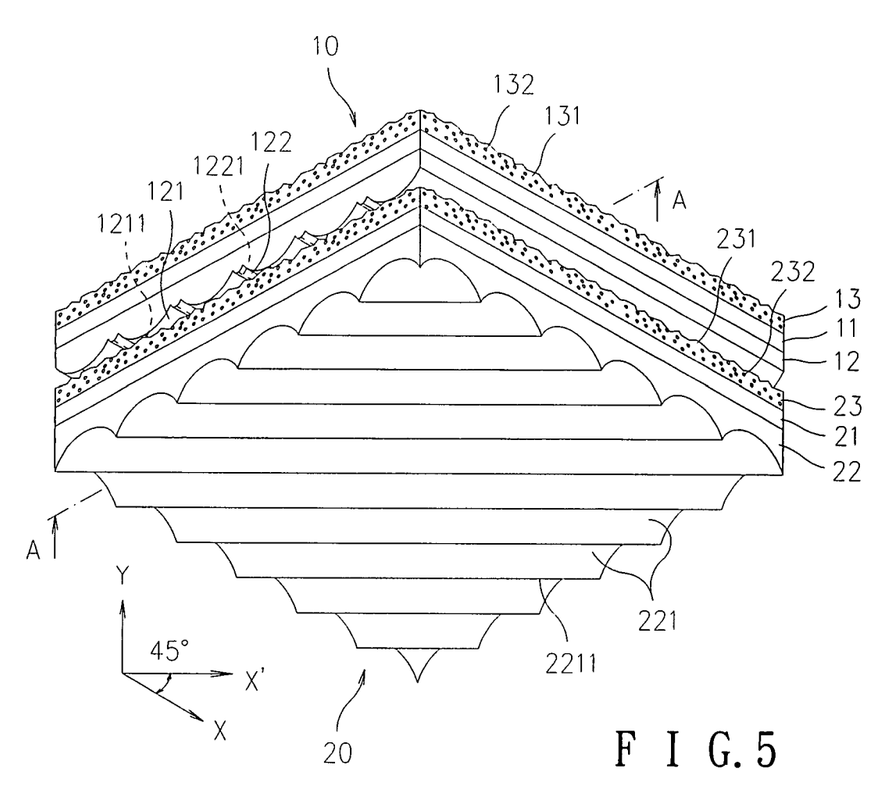
FIG. 5 is a 3D diagram depicting the compound light diffuser that is formed by combining the convex diffusing piece of FIG. 3 and the concave diffusing piece of FIG. 4.
Figure 5A:
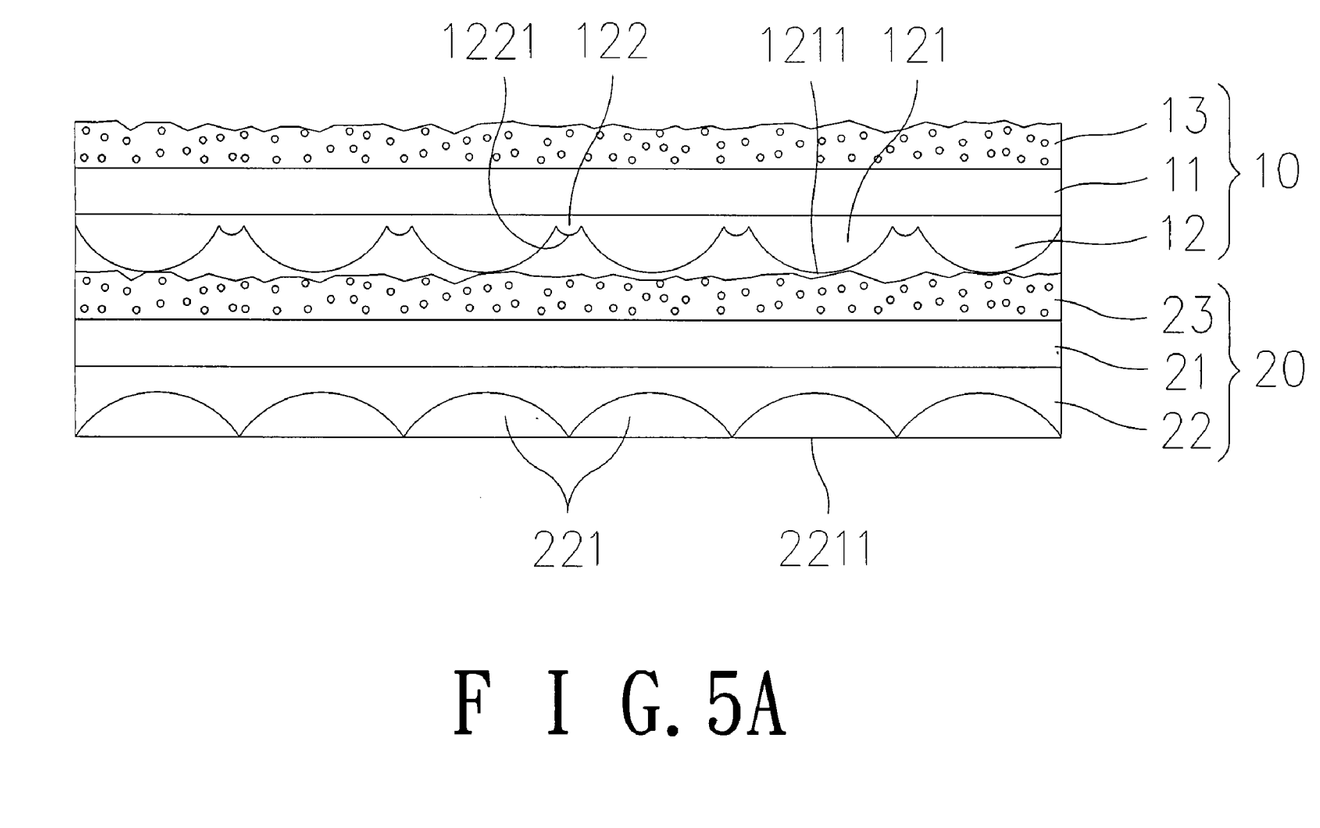
FIG. 5A is the A—A sectional view of FIG. 5.

Please refer to FIG. 5 and FIG. 5A, where the convex light diffusing piece 10 is laid intimately over the top of the concave light diffusing piece 20. The convex light diffusion piece 10 and the concave light diffusing piece 20 are joined together such that the rugged surface of the diffusion layer 13 faces upward and the side with the convex ridges associated with the ridge-shaped layer 12 faces downward. The inter-ridge distance of the two adjacent large ridges 121 is 60 nanometers and its ridge's height is 25 nanometers. The inter-ridge distance of two adjacent small ridges 122 is 60 nanometers and its ridge's height is 10 nanometers. Moreover, the convex ridges extend longitudinally parallel to the X-axis direction as shown in FIG. 5. The substrate 11 is 100 nanometers thick. Furthermore, the rugged surface of the diffusion layer 23 of the concave light diffusing piece 20 face upward, while the concave ridges 221 associated with the ridge-shaped layer 22 faces downward. The inter-ridge distance of two adjacent concave ridges is 60 nanometers and the ridge's height is 20 nanometers. Each concave ridge is extended parallel to the X'-axis, where X'-axis and X-axis makes a included angle of 45°. The substrate 21 is 100 nanometers thick.

The convex light diffusing piece 10 and the concave light diffusing piece 20 can be joined onto each other intimately, thereby forming a high brightness diffuser. To facilitate joining the convex light diffusing piece 10 onto the concave light diffusing piece 20 with no joining material used, static electricity can be applied onto the rugged surface associated with the diffusion layer 23 such that the joining of the convex light diffusing piece 10 and the concave light diffusing piece 20 can be accomplished in a vacuum environment.

Figure 6:
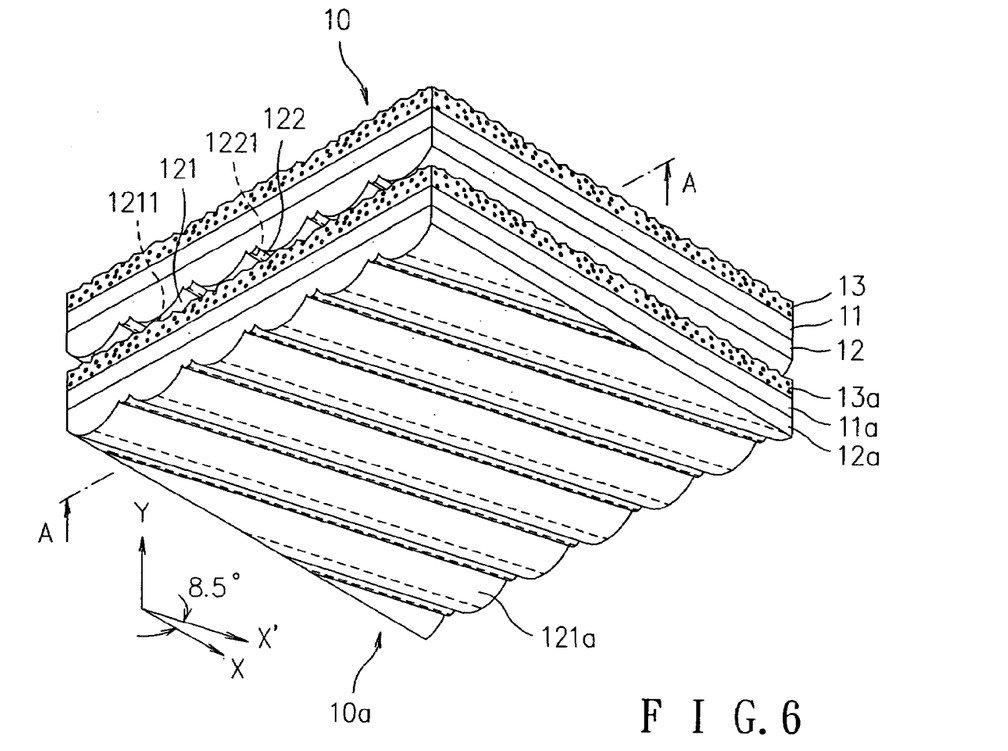
FIG. 6 is a 3D diagram depicting the compound light diffuser that is formed by stacking two convex diffusing piece of FIG. 3.
Figure 6A:
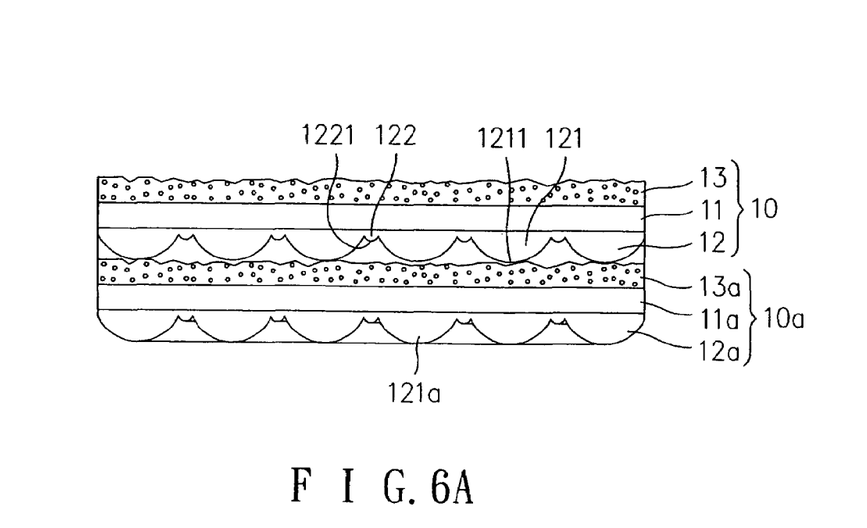
FIG. 6A is the A—A sectional view of FIG. 6.

Another embodiment of the present invention is shown in FIGS. 6 and 6A, wherein two convex light diffusing pieces 10 and 10a are paired up to form another high brightness diffuser. The two convex diffusing pieces 10 and 10a are joined together with one piece laid intimately over the top of the other. The convex light diffusing pieces 10 and 10a are configured such that the rugged surface of the diffusion layer 13 of the convex light diffusing piece 10 located at the upper deck faces upward and the ridges associated with the ridge-shaped layer 12 faces downward. The inter-ridge distance of the two adjacent large ridges 121 is 60 nanometers and its ridge's height is 25 nanometers, whereas the inter-ridge distance of two adjacent small ridges 122 is 60 nanometers and its ridge's height is 10 nanometers. Moreover, both the large ridges 121 and the small ridges 122 extend longitudinally in the X-axis direction. The substrate 11 is 100 nanometers thick. The rugged surface associated with the diffusion layer 13a of the convex light diffusing piece 10a located at the lower deck faces upward, whereas the ridges associated with the ridge-shaped layer 12a faces downward. The inter-ridge distance is 60 nanometers and the ridge's height is 20 nanometers. The substrate 11a is 100 nanometers thick. The present embodiment has the characteristics that the large ridges 121a of the lowest layer of this light diffusing piece 10a and their associated longitudinal extension lines are parallel to the X' direction, where X'-axis and X-axis makes an included angle of 8.5°.

An intimate joining of two light diffusion pieces 10 and 10a can form a light diffuser capable of emitting light of superior brightness. The intimate joining can be accomplished through the application of static electricity on the rugged surface 13a in a vacuum environment, using no joining materials.

Figure 7:
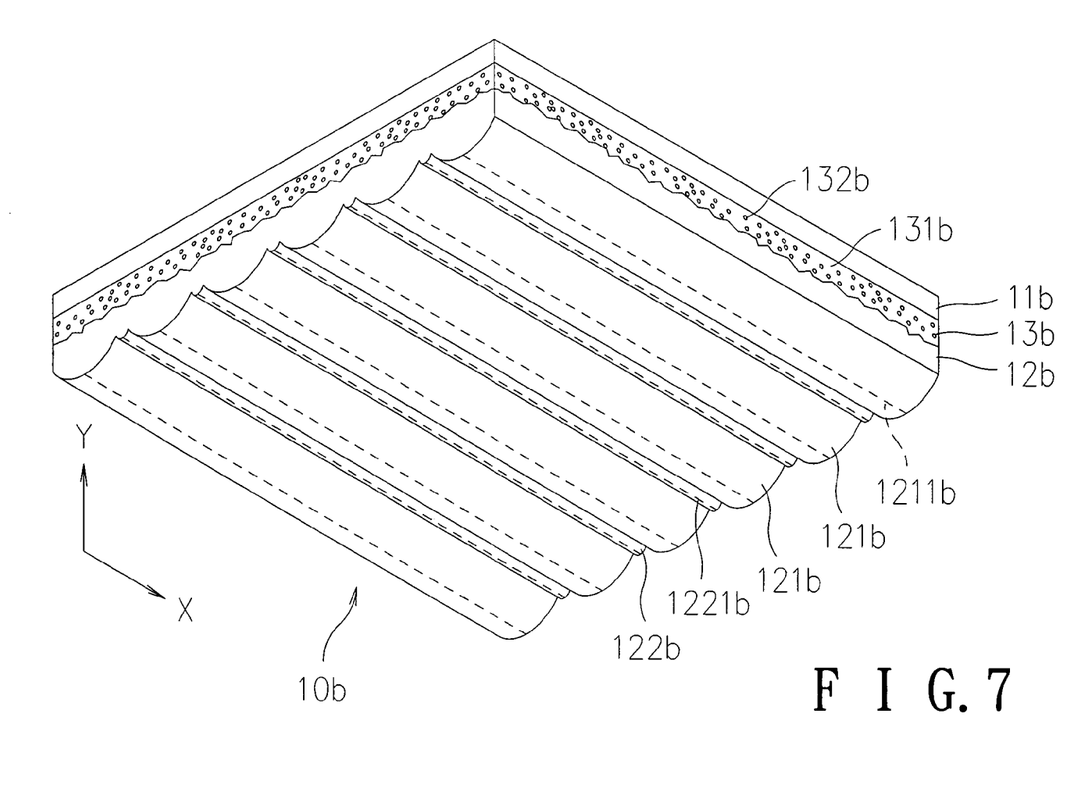
FIG. 7 is a 3D diagram of the convex diffusing piece according to another embodiment of the present invention.

FIG. 7 shows another convex diffusing piece according to the present invention. The convex diffusing piece 10b comprises a substrate 11b, a ridge-shaped layer 12b and a diffusion layer 13b. The substrate 11b, ridge-shaped layer 12b and diffusion layer 13b all are transparent. As seen in FIG. 7, the diffusion layer 13b is sandwiched in between the substrate 11 and the ridge-shaped layer 12b. The ridge-shaped layer 12b has a plurality of large convex ridges 121b and small convex ridges arranged thereon where the large convex ridges 121b is disposed immediately next to its smaller counterpart 122b, and all of these ridges are parallel to the X-axis as shown in FIG. 7. The large convex ridges 121b has a ridgeline 1211b associated with it. With an inter-ridge distance being defined as the distance between the ridgelines of the two adjacent large ridges, and a ridge height being defined as the difference of altitude between the ridgeline and the line separating the large ridge and the small ridge, the inter-ridge distances are equal to each other and the ridge heights are equal to each other. In addition, the small convex ridges 122b has a ridgeline 1221b associated with it. With an inter-ridge distance being defined as the distance between the ridgelines of the two adjacent small ridges, and a ridge height being defined as the difference of altitude between the ridgeline and the line separating the large ridge and the small ridge, the inter-ridge distances are equal to each other and the ridge heights are equal to each other. The diffusion layer 13b is made up with a transparent thin layer 131b and numerous light-diffusing particles 132b, which are uniformly dispersed within the transparent layer 131b. One side of said transparent layer has a rugged surface, and the sizes of the diffusion particles 132b may range from several tens of nanometers to several units of micrometers. The light-diffusing particles 132b may have shapes that include but not limited to sphere, oval, cylinder or other polyhedrons. In order to reduce the amount of light absorbed during diffusion, the chemical composition of the light diffusion particles 132b may include those materials having zero extinction coefficient substantially equal to zero, such as $TiO_2$, $SiO_2$, $BaSO_4$, $MgO_2$ or ZnS.

Figure 8:
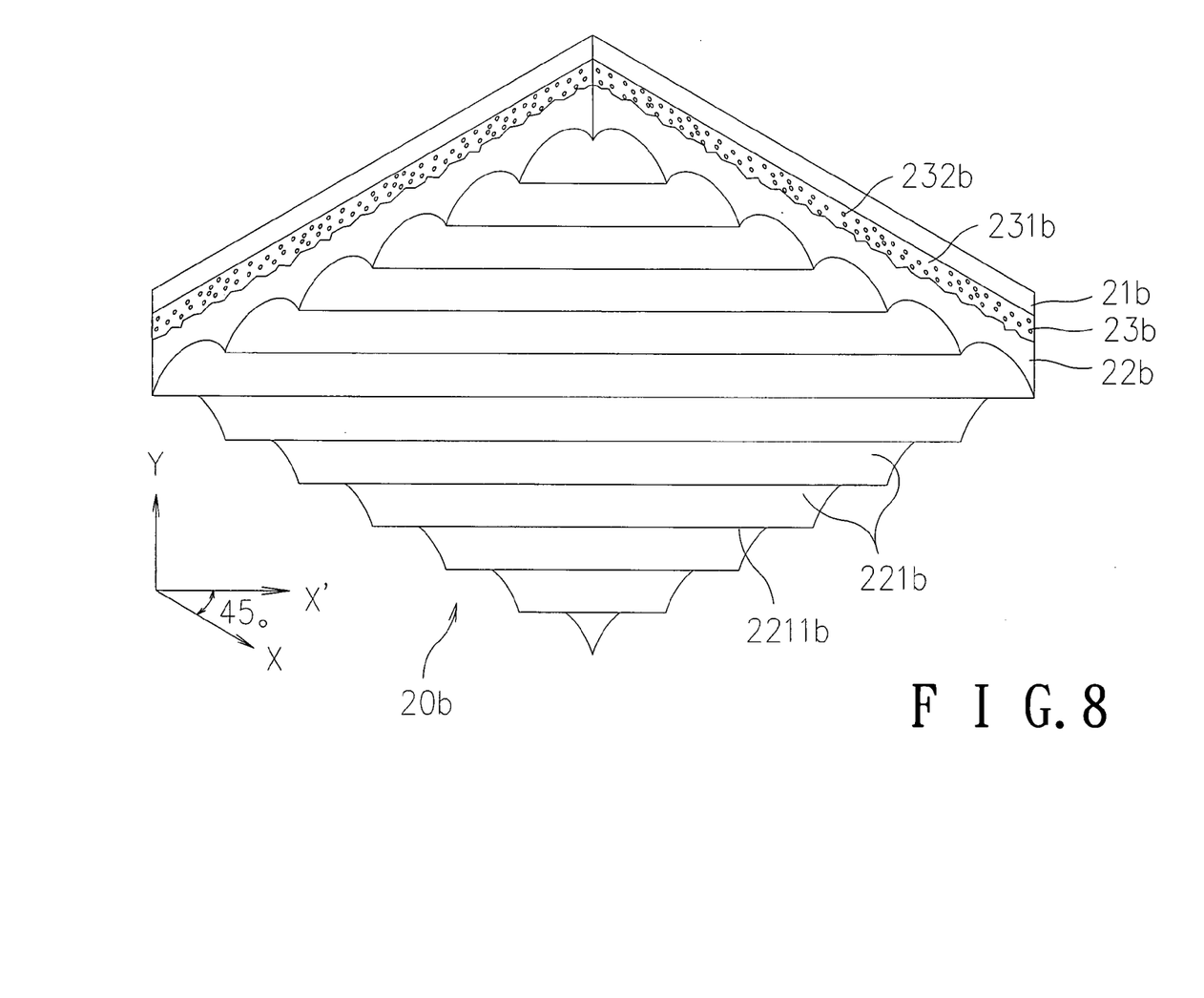
FIG. 8 is a 3D diagram of the concave diffusing piece according to another embodiment of the present invention.

FIG. 8 shows a concave diffusing piece according to the present invention. The concave diffusing piece 20b comprises a substrate 21b, a ridge-shaped layer 22b and a diffusion layer 23b. The substrate 21b, ridge-shaped layer 22b and diffusion layer 23b all are transparent. As seen in FIG. 8, the diffusion layer 23b is sandwiched in between the substrate 21b and the ridge-shaped layer 22b. The ridge-shaped layer 22b has a plurality of concave ridges 221b arranged thereon. Between every two concave ridge, there has a ridgeline 2211b. With an inter-ridge distance being defined as the distance between the ridgelines 2211b of the two adjacent concave ridges, and a ridge height being defined as the difference of altitude between the ridgeline and the bottom line (or the center line or the valley) of the concave ridge, the inter-ridge distances are equal to each other and the ridge heights are equal to each other. Each concave ridge along with its ridgeline have an extension line parallel to the X'-axis, where the X'-axis and aforementioned X-axis makes an included angle of 45°. The diffusion layer 23b is composed with the thin transparent layer 231b and the light-diffusing particles 232b uniformly dispersed within the transparent layer 231b. The transparent layer 231b has a rugged surface, and the sizes of the diffusion particles 232b may range from several tens of nanometers to several units of micrometers. The light diffusing particles 232b may have the shapes that include but not limited to spheres, ovals, cylinders or other polyhedrons. In order to reduce the amount of light absorbed during diffusion, the chemical composition of the light diffusion particles 232b may include those materials having zero extinction coefficient zero, such as $TiO_2$, $SiO_2$, $BaSO_4$, $MgO_2$ or ZnS.

Figure 9:
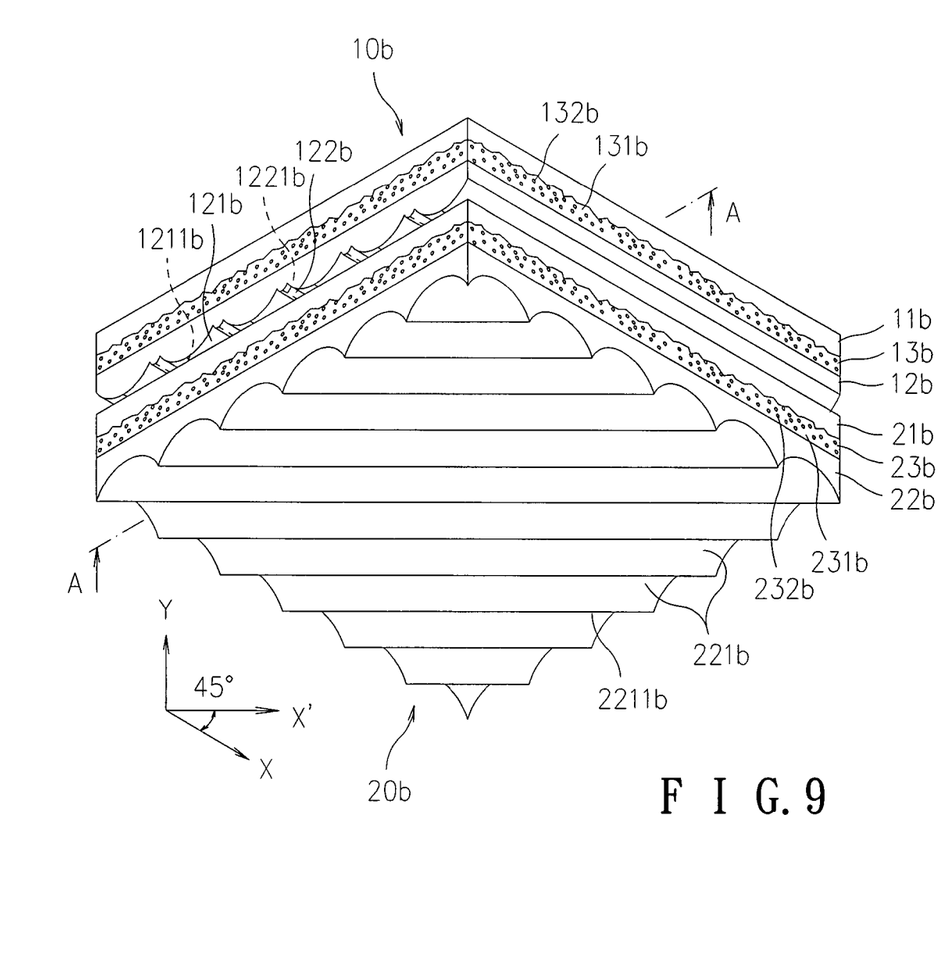
FIG. 9 is a 3D diagram depicting the compound light diffuser that is formed by combining the convex diffusing piece of FIG. 7 and the concave diffusing piece of FIG. 8.
Figure 9A:
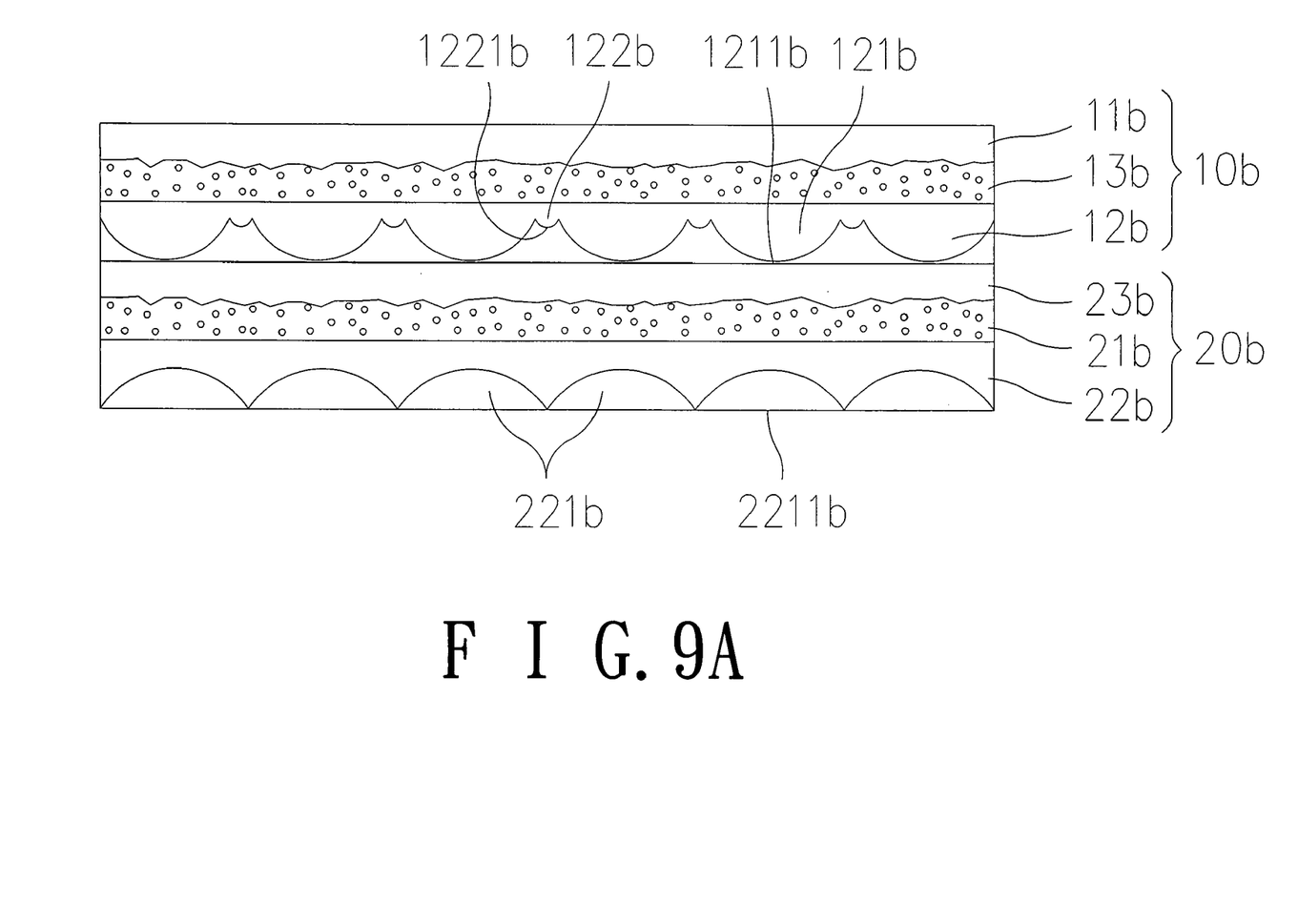
FIG. 9A is the A—A sectional view of FIG. 9.

Please refer to FIG. 9 and FIG. 9A, where the convex light diffusing piece 10b is laid intimately over the top of the concave light diffusing piece 20b. The convex light diffusion piece 10b and the concave light diffusing piece 20b are joined together such that the rugged surface of the diffusion layer 13b faces upward and the side with the convex ridges associated with the ridge-shaped layer 12b faces downward. The inter-ridge distance of the two adjacent large ridges 121b is 60 nanometers and its ridge's height is 25 nanometers. The inter-ridge distance of two adjacent small ridges 122b is 60 nanometers and its ridge's height is 10 nanometers. Moreover, the convex ridges extend longitudinally parallel to the X-axis direction as shown in FIG. 5. The substrate 11b is 100 nanometers thick. Furthermore, the rugged surface of the diffusion layer 23b of the concave light diffusing piece 20b face upward, while the concave ridges 221b associated with the ridge-shaped layer 22b faces downward. The inter-ridge distance of two adjacent concave ridges is 60 nanometers and the ridge's height is 20 nanometers. Each concave ridge is extended parallel to the X'-axis, where X'-axis and X-axis makes a included angle of 45°. The substrate 21b is 100 nanometers thick.

The convex light diffusing piece 10b and the concave light diffusing piece 20b can be joined onto each other intimately, thereby forming a high brightness diffuser. To facilitate joining the convex light diffusing piece 10b onto the concave light diffusing piece 20b with no joining material used, static electricity can be applied onto the rugged surface associated with the diffusion layer 23b such that the joining of the convex light diffusing piece 10b and the concave light diffusing piece 20b can be accomplished in a vacuum environment.

Figure 10:
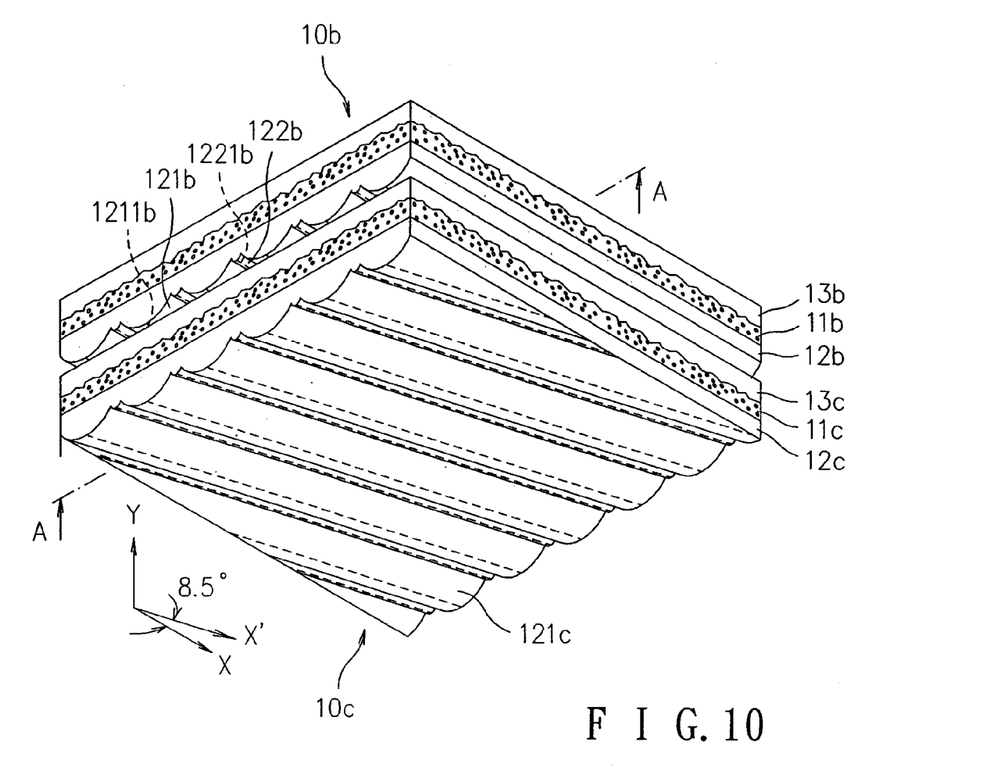
FIG. 10 is a 3D diagram depicting the compound light diffuser that is formed by stacking two convex diffusing piece of FIG. 7.
Figure 10A:
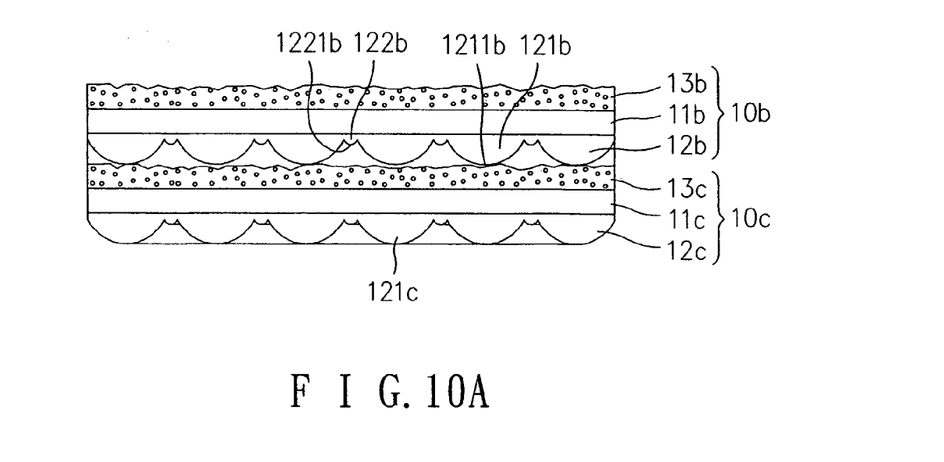
FIG. 10A is the A—A sectional view of FIG. 10.

Another embodiment of the present invention is shown in FIGS. 10 and 10A, wherein two convex light diffusing pieces 10b and 10c are paired up to form another high brightness diffuser. The two convex diffusing pieces 10b and 10c are joined together with one piece laid intimately over the top of the other. The convex light diffusing pieces 10b and 10c are configured such that the rugged surface of the diffusion layer 13b of the convex light diffusing piece 10b located at the upper deck faces upward and the ridges associated with the ridge-shaped layer 12b faces downward. The inter-ridge distance of the two adjacent large ridges 121b is 60 nanometers and its ridge's height is 25 nanometers, whereas the inter-ridge distance of two adjacent small ridges 122b is 60 nanometers and its ridge's height is 10 nanometers. Moreover, both the large ridges 121b and the small ridges 122b extend longitudinally in the X-axis direction. The substrate 11b is 100 nanometers thick. The rugged surface associated with the diffusion layer 13c of the convex light diffusing piece 10c located at the lower deck faces upward, whereas the ridges associated with the ridge-shaped layer 12c faces downward. The inter-ridge distance is 60 nanometers and the ridge's height is 20 nanometers. The substrate 11c is 100 nanometers thick. The present embodiment has the characteristics that the large ridges 121c of the lowest layer of ths light diffusing piece 10c and their associated longitudinal extension lines are parallel to the X' direction, where X'-axis and X-axis makes an included angle of 8.5°.

Figure 11:
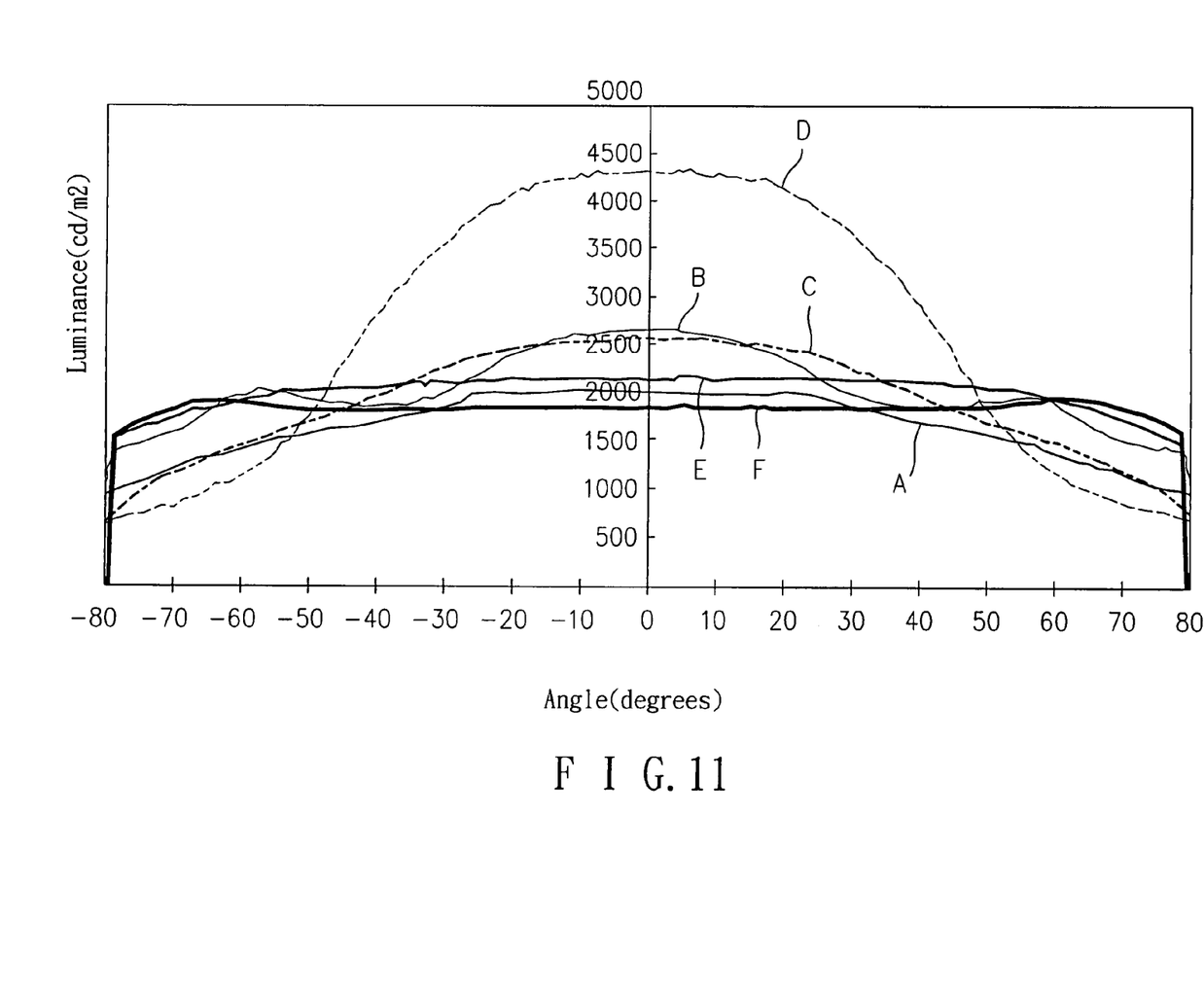
FIG. 11 is the photometric performance of the light diffusers embodying the present invention as represented in FIGS. 5 and 6 and those embodying the prior art.

An intimate joining of two light diffusion pieces 10b and 10c can form a light diffuser capable of emitting light of superior brightness. The intimate joining can be accomplished through the application of static electricity on the rugged surface of the diffusion layer 13c in a vacuum environment, using no joining materials FIG. 11 shows the brightness performance with respect to viewing angle for the embodiments detailed in FIGS. 5 and 6 of the present invention and for those embodiments representing the prior art. In FIG. 11, Curve A represents the brightness performance of the light diffuser disclosed in U.S. Pat. No. 6,327,083. Similarly, Curves B and C represent the brightness performance of light diffusers employing the prior art, while Curve D represents the brightness performance of a light diffuser of a rear projection screen. Furthermore in FIG. 11, Curve E represents the brightness performance of a convex type diffuser 10 and a concave type diffuser 20 detailed in FIG. 5, and Curve F represents the compound light diffuser formed by laying double convex type diffusion pieces 10 and 10a over each other. From FIG. 11, it is known that better performance of brightness of light diffusers embodying the prior art as represented by Curves A, B, C and D can only be realized within the 60° front viewing angle, whereas the brightness beyond the center 60° front viewing angle is considerably reduced. However, the brightness of the light diffuser embodying the present invention as represented by Curves E and F is evenly spread over the center 80° of the front viewing angle, and thus has the merit of high output brightness plus wide-angle uniformity. This is an advantage, which can not be realized by the light diffusers embodying the prior art. The light diffuser embodying the present invention can not only be used in a large-scale screen, but can also be utilized in a rear projection module due to its small size, which is about one quarter the size of the prior-art diffusers. Besides, the light diffuser embodying the present invention can form different kinds of diffusers that have different optical characteristics through various combinations of the convex type diffuser and the concave type diffuser to meet different products' requirements.

In summary, the present invention has the following the merits:
1. Great brightness output,
2. Wide-angle brightness uniformity
3. Thinned structure
4. Joint with shielding effect
5. Flexible structural variation to meet various product requirements While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A high brightness diffuser, comprising:
   a convex light diffusing piece with ridge-shaped structure arranged on a surface thereof, being consisted of a plurality of large convex ridges and a plurality of small convex ridges, wherein each of the convex ridges has a ridgeline, and the large ridge and small ridge are interlace-arranged, and the plural ridges along with the associated ridgelines are extending toward a same direction;
   a concave light diffusing piece with ridge-shaped structure arranged on a surface thereof, being consisted of a plurality of concave ridges associated with a ridgeline existing in between two adjacent ridges, wherein the plural ridges along with the associated ridgelines are extending toward a same direction; and
   wherein, the two light diffusing pieces are stacked up by plastering the surface with ridge-shaped structure of the convex light diffusing piece on the surface without ridge-shaped structure of the concave light diffusing piece, and enabling an included angle to be formed between the two ridge-extending directions of the two light diffusing pieces.

2. The high brightness diffuser of claim 1, wherein the included angle is 45°.

3. The high brightness diffuser to claim 1, wherein, with an inter-ridge distance being defined as the distance between the ridgelines of the two adjacent large ridges, and a ridge height being defined as the difference of altitude between the ridgeline and the line separating the large ridge and the small ridge, the inter-ridge distances are equal to each other and the ridge heights are equal to each other.

4. The high brightness diffuser to claim 1, wherein, with an inter-ridge distance being defined as the distance between the ridgelines of the two adjacent small ridges, and a ridge height being defined as the difference of altitude between the ridgeline and the line separating the large ridge and the small ridge, the inter-ridge distances are equal to each other and the ridge heights are equal to each other.

5. The high brightness diffuser to claim 1, wherein, with an inter-ridge distance being defined as the distance between the ridgelines of the two adjacent concave ridges, and a ridge height being defined as the difference of altitude between the ridgeline and the bottom line of the concave ridge, the inter-ridge distances are equal to each other and the ridge heights are equal to each other.

6. The high brightness diffuser to claim 1, wherein both the convex light diffusing piece and the concave light diffusing piece further comprise respectively a substrate, a ridge-shaped layer and a diffusion layer consisted of a thin transparent layer having a rugged external surface and numerous light diffusing particles uniformly dispersed within the thin transparent layer, and the substrate is sandwiched in between the ridge-shaped layer and the diffusion layer.

7. The high brightness diffuser to claim 1, wherein both the convex light diffusing piece and the concave light diffusing piece further comprise respectively a substrate, a ridge-shaped layer and a diffusion layer consisted of a thin transparent layer having a rugged external surface and numerous light diffusing particles uniformly dispersed within the thin transparent layer, and the diffusion layer is sandwiched in between the ridge-shaped layer and the substrate.

8. The high brightness diffuser to claim 1, wherein the convex light diffusing piece further comprises a substrate, a ridge-shaped layer and a diffusion layer consisted of a thin transparent layer having a rugged external surface and numerous light diffusing particles uniformly dispersed within the thin transparent layer, and the diffusion layer is sandwiched in between the ridge-shaped layer and the substrate.

* * * * *